United States Patent [19]

Hasegawa

[11] Patent Number: 4,483,308

[45] Date of Patent: Nov. 20, 1984

[54] AIR INTAKE SIDE SECONDARY AIR SUPPLY SYSTEM FOR AN INTERNAL COMBUSTION ENGINE EQUIPPED WITH EXHAUST GAS RECIRCULATION CONTROL SYSTEM

[75] Inventor: Shumpei Hasegawa, Niiza, Japan

[73] Assignee: Honda Giken Kogyo Kabushiki Kaisha, Tokyo, Japan

[21] Appl. No.: 599,300

[22] Filed: Apr. 12, 1984

[30] Foreign Application Priority Data

Apr. 19, 1983 [JP] Japan ................................ 58-068929

[51] Int. Cl.³ .......................................... F02M 25/06
[52] U.S. Cl. .................................... 123/571; 123/489; 123/589
[58] Field of Search ........................ 123/571, 489, 589

[56] References Cited

U.S. PATENT DOCUMENTS

| | | | |
|---|---|---|---|
| 3,759,232 | 9/1973 | Wahl et al. | 123/589 |
| 4,280,471 | 7/1981 | Masaki | 123/571 |
| 4,320,726 | 3/1982 | Etoh et al. | 123/571 |
| 4,325,348 | 4/1982 | Abe et al. | 123/571 |
| 4,349,006 | 9/1982 | Gotoh et al. | 123/571 |
| 4,372,277 | 2/1983 | Otobe et al. | 123/571 |
| 4,386,597 | 6/1983 | Ootaka et al. | 123/571 |
| 4,445,489 | 5/1984 | Kobayashi et al. | 123/571 |

*Primary Examiner*—Wendell E. Burns
*Attorney, Agent, or Firm*—Pollock, VandeSande & Priddy

[57] ABSTRACT

An air intake side secondary air supply system for an internal combustion engine equipped with an exhaust gas recirculation (EGR) system uses a single source of control pressure for supplying a control pressure both into an air control valve for controlling the amount of the air intake side secondary air and an EGR flow control valve for controlling the amount of exhaust gas recirculation. Further, a pressure supply passage for directing the control pressure into the air control valve and the EGR flow control valve is designed to provide a desirable relation between the operations of the air control valve and the EGR flow control valve in accordance with an air/fuel ratio detection signal.

4 Claims, 6 Drawing Figures

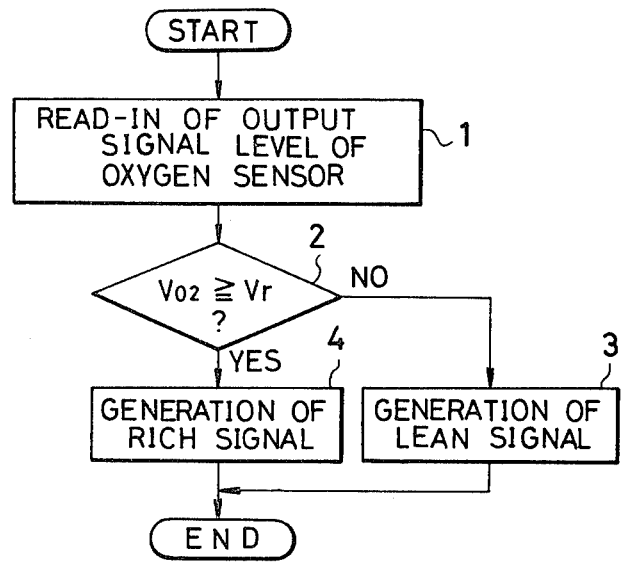
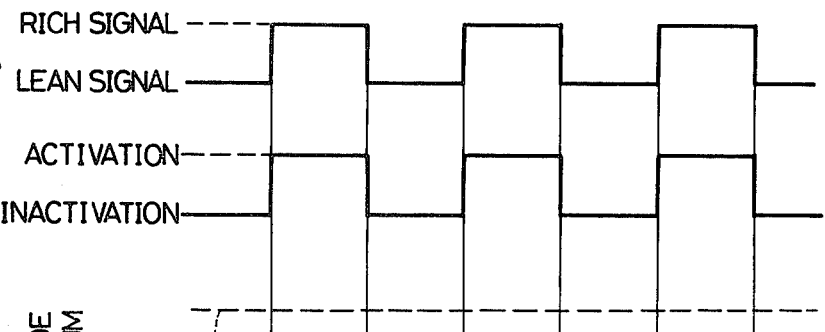
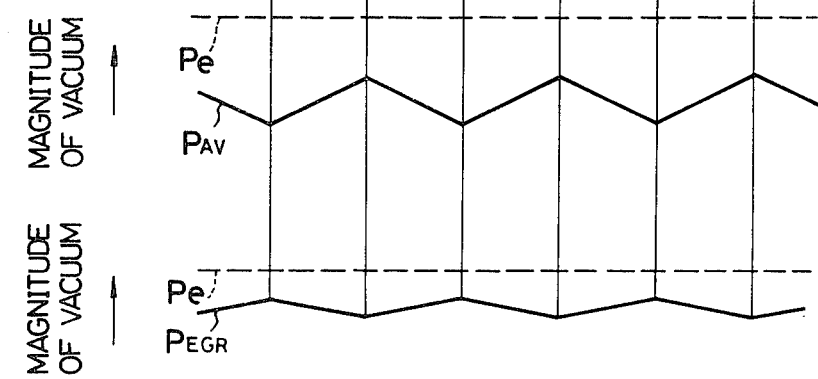

AIR INTAKE SIDE SECONDARY AIR SUPPLY SYSTEM FOR AN INTERNAL COMBUSTION ENGINE EQUIPPED WITH EXHAUST GAS RECIRCULATION CONTROL SYSTEM

BACKGROUND OF THE INVENTION

1. Field of the Invention

The present invention relates to an air intake side secondary air supply system for an internal combustion engine equipped with exhaust gas recirculation (EGR) system.

2. Description of Background Information

In an internal combustion engine provided with a three-way catalytic converter in the exhaust system, the air/fuel ratio of the engine is controlled around a stoichiometric value (14.7:1 for example) in accordance with the composition of exhaust gas and the operational conditions of the engine in order to provide an optimum operation of the three-way catalytic converter. The so called air intake side secondary air supply system is an example of the air/fuel ratio control system of this type which has a secondary air passage leading to a portion of an intake air passage downstream of the throttle valve and in which the amount of the secondary air passing therethrough is controlled by varying the sectional area of the secondary air passage so as to adjust the air/fuel ratio of the mixture to be supplied to the engine.

In this secondary air supply system, an air control valve is disposed in the secondary air supply passage, for varying the sectional area of the secondary air supply passage. This is performed by controlling the opening degree of the air control valve in accordance with the pressure level in a pressure chamber of the air control valve. In this case, the pressure chamber is supplied with a control pressure which varies with the operational conditions of the engine. Further, the actual air/fuel ratio is detected from an oxygen concentration of the exhaust gas, and the secondary air is supplied, via the air control valve, to the downstream of the throttle valve, for example by controlling the control pressure, when the detected air/fuel ratio is rich and the supply of the secondary air is stopped or the amount of the secondary air is gradually reduced when the detected air/fuel ratio is lean.

In addition, it is also necessary to decrease the combustion temperature in the engine cylinders in order to prevent the formation of NOx (Nitrogen Oxides) which is one of noxious component contained in the exhaust gas of the engine. Therefore, some internal combustion engines are provided with an exhaust gas recirculation (EGR) system for reducing the combustion temperature, which recircultates a part of exhaust gas into the intake air passage to slow down the combustion process. The exhaust gas recirculation system generally includes an EGR passage connecting the exhaust passage and the intake air passage, and a vacuum operated EGR flow control valve disposed in the EGR passage for varying the sectional area of the EGR passage in accordance with the level of the pressure applied to a pressure chamber thereof. The pressure chamber of the EGR flow control valve is generally applied with a control pressure which varies with the operational conditions of the engine.

In the event that the air intake side secondary air supply system is provided to an internal combustion engine equipped with the EGR system, it is desirable to control the opening degree of the air control valve and the EGR flow control valve by supplying a control pressure from a single source of the control pressure, which varies with the operational conditions of the engine, an amount of the intake air for example. This is very important for the simplification of the total construction of the peripheral systems of the internal combustion egine and the reduction of the production costs.

However, if the pressure chambers of the air control valve and the EGR flow control valve are provided with the same control pressure from the single source of control pressure, then there is a fear that the combustion temperature is excessively reduced in some conditions, to adversely affect the performance of the engine. More concretely, the amount of EGR may be increased during a period in which the air/fuel ratio is controlled to the lean side by supplying the air intake side secondary air after a detection of the rich air/fuel ratio.

SUMMARY OF THE INVENTION

An object of the invention is therefore, to provide an air intake side secondary air supply system for an internal combustion engine equipped with exhaust gas recirculation system, in which the opening degrees of the air control valve and the EGR flow control valve are controlled by means of a control pressure from a single source of the control pressure, without deteriorating the performance of the engine.

According to the present invention, the air intake side secondary air supply system for an internal combustion engine in which a control pressure from a source of the control pressure is applied, via a first pressure passage, to a pressure chamber of an EGR flow control valve, and the pressure value in the pressure chamber of the air control valve is gradually varied by making communication between the first pressure passage and the pressure chamber of the air control valve when the air/fuel ratio is detected to be rich.

Further scope and applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the following description taken in conjunction with the accompanying drawings which are given by way of illustration only, and thus are not limitative of the present invention, and wherein:

FIG. 2 is a flowchart showing the operation of the conntrol circuit 22 of FIG. 1; and FIGS. 3A, 3B, 3C, and 3D are diagrams showing the variation of the pressure levels in the pressure chambers of the air control valve 12 and the EGR flow control valve 47 with respect to the operation of the electromagnetic valve 13 in the system of FIG. 1

DETAILED DESCRIPTION OF PREFERRED EMBODIMENTS

Figure 1:
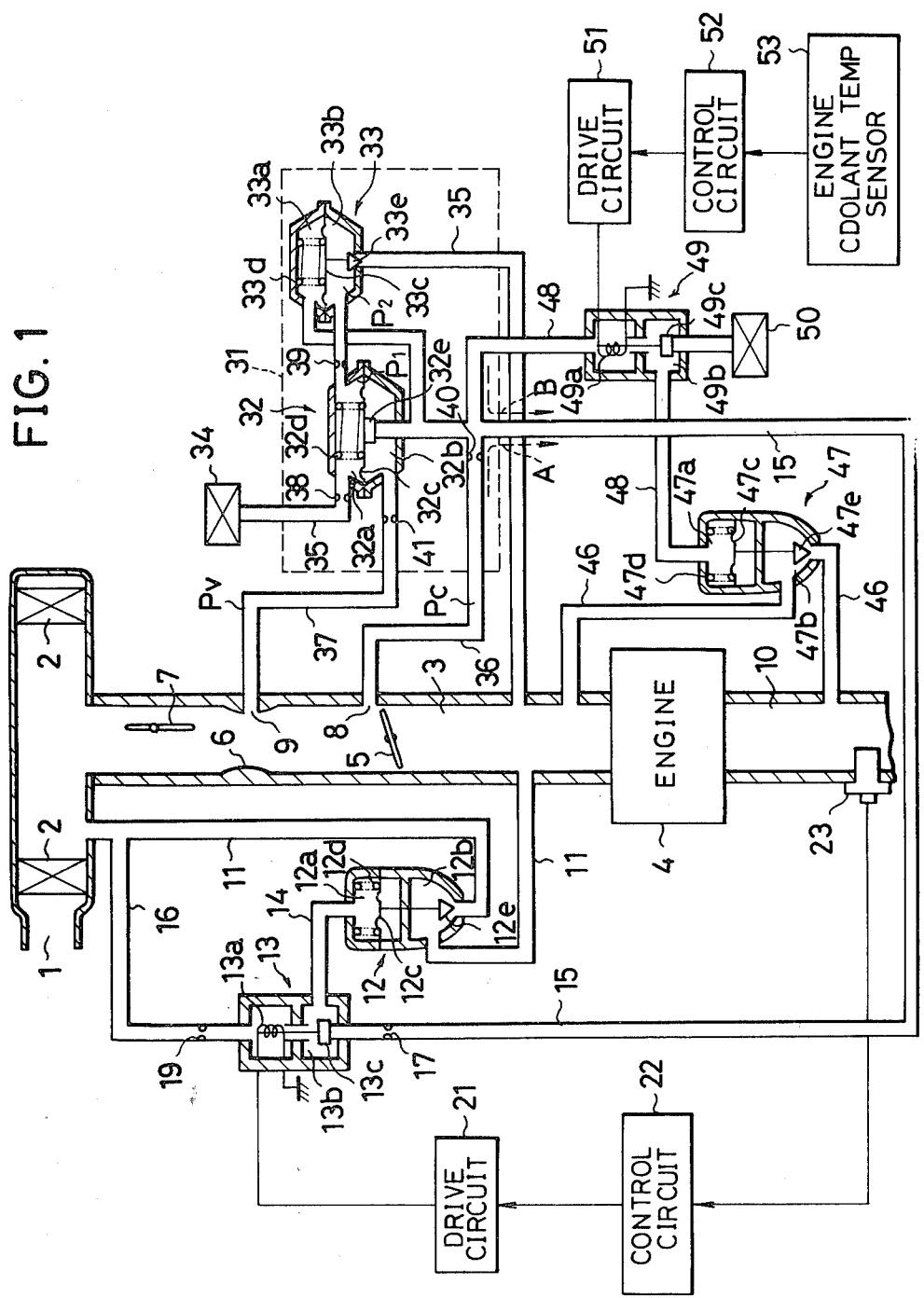
FIG. 1 is a schematic diagram of an embodiment of the air intake side secondary air supply system for an internal combustion engine equipped with the EGR system according to the present invention.

An embodiment of the present invention will be explained with reference to the schematic diagram of FIG. 1 hereinafter.

As shown, intake air taken from an air inlet port 1 is supplied to an internal combustion engine 4 via an air cleaner 2 and intake air passage 3. In the intake air passage 3, a throttle valve 5 is provided in the middle. Further, a venturi 6 is formed upstream from the throttle valve 5 and a choke valve 7 is disposed upstream of the venturi 6. In the wall surface of the intake air passage 3, in proximity to the position of the throttle valve 5, a vacuum detection hole 8 is provided in such a manner that the vacuum detection hole 8 is located upstream from the throttle valve 5 when the throttle valve 5 is closed, and located downstream from the throttle valve 5 when the throttle valve 5 is opened. A second vacuum detection hole 9 is also provided to the venturi 6. A portion of the air intake system downstream of the throttle valve 5, i.e., the intake manifold is communicated with a portion around an air outlet port of the air cleaner 2 via an air intake side secondary air passage 11. In the secondary air passage 11, there is provided an air control valve 12 which consists of a vacuum chamber 12a, a valve chamber 12b acting as a part of the secondary air passage 11, a diaphragm 12c defining a wall of the vacuum chamber 12a, and a needle type valve element 12e placed in the valve chamber 12b and applied with a biasing force of a valve spring 12d.

To the vacuum chamber 12a of the air control valve 12, there is applied a vacuum pressure from a three-way electro-magnetic valve 13 via a pressure passage 14. The electro-magnetic valve 13 includes a soleniod 13a, a valve chamber 13b communicated with the vacuum chamber 12a via the pressure passage 14, and a valve element 13c which is mounted in the valve chamber 13b and magnetically coupled with the solenoid 13a. The valve chamber 13b is communicated with a vacuum control part 31 which produces a first control pressure via a vacuum passage 15 for introducing the first control pressure, and also communicated with the part of the secondary air passage 11 upstream from the air control valve 12 via an atmospheric pressure passage 16 for introducing a second control pressure. When the soleniod 13 is not energized, the side of the vacuum passage 15 is closed, and at the same time the pressure passage 14 and the atmospheric pressure passage 16 is communicated with each other via the valve chamber 13b. On the other hand, when the solenoid 13a is energized, the side of the atmospheric pressure passage 16 is closed, and at the same time the pressure passage 14 and the vacuum passage 15 is communicated with each other. In addition, an orifice 17 is provided to the vacuum passage 15 and an orifice 19 is provided to the atmospheric pressure passage 16.

The soleniod 13a is connected, via a drive circuit 21, to a control circuit 22. The control circuit 22 is connected with an oxygen sensor 23 which is disposed in an exhaust pipe 10 of the engine 4 and produces a voltage signal whose level is indicative of the oxygen concentration in the exhaust gas of the engine.

The vacuum control part 31 consists of a vacuum responsive regulator valve 32 and an air valve 33 which consist of a vacuum chamber 32a or 33a, a diaphragm 32c or 33c, a valve spring 32d or 33d, and a valve element 32e or 33e respectively. The vacuum chamber 32a is disposed in the middle of a control air passage 35 which leads from an atmospheric air inlet port 34 with a filter to a part of the intake air passage downstream of the throttle valve 5, and the valve chamber 33b is disposed in the control air passage 35 downstream of the vacuum chamber 32a. The valve element 33e is applied with a resilient force of the valve spring 33d via the diaphragm 33c so as to close the control air passage 35. The vacuum chamber 33a is communicated with the vacuum detection hole 8 via a vacuum passage 36, and similarly, the valve chamber 32b diaphragm 32c so that the communication between the valve chamber 32b and the vacuum passage 36 is closed by the valve element 32e. In addition, in the control air passage 35, a pair of orifices 38 and 39 are provided respectively upstream and downstream of the vacuum chamber 32a. Further, orifices 40 and 41 are provided in the vacuum passage 36 and the vacuum passage 37 respectively.

A part of the vacuum passage 36 of the side of the valve chamber 32b and the vacuum chamber 33a from the orifice 40, is communicated with the vacuum passage 15.

Further, the exhaust pipe 10 is connected to the intake air passage at the downstream of the throttle valve 5 by means of an EGR passage 46 in which an EGR flow control valve 47 is provided. The EGR flow control valve 47 is, as the air control valve 12, made up of a vacuum chamber 47a, a valve chamber 47b, a digphragm 47c, a valve spring 47d, and a valve element 47e, and controls the sectional area of the EGR passage 46 in accordance with the magnitude of vacuum applied to the pressure chamber thereof, in a manner that the sectional area increases as the magnitude of the vacuum increases.

The vacuum chamber 47a is communicated to the vacuum passage 36, at a point of connection to the vacuum passage 15 by means of a vacuum passage 48 in which a three-way electro-magnetic valve 49 is disposed. The three-way electro-magnetic valve 49 is, as the electro-magnetic valve 13, made up of a solenoid 49a, a valve chamber 49b, and a valve element 49e, and closes the vacuum passage 48 and makes the communication between a part of the vacuum passage 48 on the side of the vacuum chamber 47a and atmospheric pressure inlet port 50 having a filter element when the soleniod 49a is energized. The solenoid 49a is connected to the control circuit 52 via the drive circuit 51. Further an engine coolant temperature sensor 53 for detecting the temperature of the engine coolant is connected to the control circuit 52. The control circuit 52 produces an EGR stop command signal when the temperature of the engine coolant is below a predetermined level, and the drive circuit 51 supplys a drive voltage to the solenoid 49a to close the EGR passage 46.

The operation of the thus constructed air intake side secondary air supply system according to the present invention will be explained hereinafter.

The operation of the vacuum control part 31 is as follows. When a vacuum Pc from the vacuum detection hole 8 is applied to the vacuum chamber 33a via the vacuum passage 36 in accordance with the operation of the engine 4, the valve element 33e is displaced in a direction to open the valve 33 if the vacuum pressure Pc is greater than the resilient force of the valve spring 33d. By the opening of the air valve 33, outside air from the atmospheric air inlet port 34 is introduced to the intake air passage 3 at the downstream of the throttle valve 5, via the control air passage 35. The vacuum P1 and the vacuum P2 respectively in the vacuum chamber 32a and the valve chamber 33b through which the outside air travels, is determined in accordance with the aperture ratio of the orifices 38 and 39 respectively.

In this condition, if the differential pressure between the vacuum Pv from the vacuum detection hole 9, acting in the valve chamber 32b and the vacuum P1 is greater than the resilient force of the valve spring 32d, the valve element 32e is displaced in the direction to open the valve 32. By this opening of the control valve 32, a part of the vacuum Pv is directed to dilute the vacuum Pc past the orifice 40 to produce a vacuum Pe.

Subsequently, due to the fall of the vacuum Pe caused by the fall of the vacuum Pc, the opening degree of the air valve 33 is decreased to reduce the amount of the air flowing through the control air passage 35. By this reduction in the air flow amount, the vacuum P1 in the vacuum chamber 32a is reduced to close the control valve 32. Then the vacuum Pe is raised once more and the above sequential operations will be repeated. It is to be noted that the ratio between the vacuum Pv and the vacuum Pe becomes equal to the ratio between the vacuum P1 and the vacuum P2, since the speed of these repeating operations is very fast.

Therefore, when the amount of the main intake air of the engine 4 is relatively small where the vacuum P1 is greater than Pv, the opening degree of the regulation valve 32 becomes large and the vacuum Pe becomes low. On the other hand, as the amount of the main intake air increases, the opening degree of the regulation valve 32 becomes smaller since the vacuum Pv increases, and consequently the vacuum Pe becomes high. Therefore, the magnitude of the vacuum Pe becomes proportional to the amount of the main intake air and the vacuum Pe is applied to the vacuum chamber 47a as a first control pressure when the electro-magnetic valve 49 is deenergized, and to the vacuum chamber 12a when the electro-magnetic valve 13 is energized.

The operation of the control circuit 22 will be then explained with reference to the flowchart of FIG. 2.

When an ignition switch (not shown) is turned on and a powef current is supplied to the control circuit 22, firstly the output voltage of the oxygen sensor 23 is read out by the control circuit 22, at a step 1. Since the oxygen sensor 23 is of the so-called flow-out type, the output voltage $V_{O_2}$ thereof increases as the ambient condition becomes rich. After reading out of the output voltage $V_{O_2}$, the air/fuel ratio of the mixture is determined at a step 2, from this output voltage $V_{O_2}$.

In this determination step, whether the air/fuel ratio is rich or lean is determined by comparing the output voltage $V_{O_2}$ of the oxygen sensor 23 with a reference voltage Vr which corresponds to a stoichiometric air/fuel ratio. If $V_{O_2} < V_r$, the air/fuel ratio is determined to be lean, and a lean signal is applied to the drive circuit 21 to shift the air/fuel ratio to the rich side, at a step 3. On the other hand, if $V_{O_2} \geq V_r$, the air/fuel ratio is determined to be rich, and a rich signal is applied to the drive circuit 21 to shift the air/fuel ratio to the lean side, at a step 4.

Thus, when the lean signal or the rich signal is applied to the drive circuit 21 from the control circuit 22, the drive circuit makes the electro-magnetic valve 13 inactivated by failing to supply the drive current of the solenoid 13a in accordance with the lean signal or makes the same activated by supplying the drive current of the soleniod 13a in accordance with the rich signal.

When the exhaust gas recirculation is performed and the air/fuel ratio is to be controlled to the stoichiometric value, the rich signal and the lean signal are in turn produced as shown in FIG. 3A and accordingly the electro-magnetic valve 13 is repeatedly activated and inactivated as shown in FIG. 3B.

When the output signal of the control circuit 22 turns from the lean signal to the rich signal, the electro-magnetic valve 13 is activated to close the side of the atmospheric pressure passage 16 and at the same time makes the communication between the pressure passage 14 and the vacuum passage 15. In this state, the level of the vacuum Pav in the vacuum chamber 12a has already approached sufficiently on the side of the atomospheric pressure from the vacuum Pe, and a vacuum level $P_{EGR}$ in the vacuum chamber 47a of the EGR flow control valve 47 is almost equal to the level of the vacuum Pe since the electro-magnetic valve 13 is inactivated. By activating the electro-magnetic valve 13, the vacuum Pc is diluted by the vacuum Pv and directed to the pressure chamber 12a of the air control valve via the vacuum passage 15, electro-magnetic valve 13 and the pressure passage 14 as shown by the arrow A of FIG. 1. At the same time, the vaccum $P_{EGR}$ in the vacuum chamber 47a is also directed to the vacuum chamber 12a via the vacuum passage 48, the vacuum passage 15 and the electro-magnetic valve 13 and the pressure passage 14 as shown by the arrow B of FIG. 1. Since the orifice 17 is provided in the vacuum passage 15, the vacuum Pav in the vacuum chamber 12a gradually increases to increase the sectional area of the air intake side secondary air supply passage 11 which in turn results in an increase in the amount of the secondary air. On the other hand, the magnitude of the vacuum $P_{EGR}$ in the vacuum chamber 47a gradually decreases to reduce the opening degree of the EGR flow control valve 47, which in turn reduces the amount of the exhaust gas recirculated into the intake air passage.

Nextly, when the output signal from the control circuit 22 turns from the rich signal to the lean signal, the electro-magnetic valve 13a is inactivated and the side of the vacuum passage 15 is closed and at the same time, the pressure passage 14 is communicated with the atmospheric pressure passage 16. As a result, the atmospheric pressure is supplied to the vacuum chamber 12a via the atmospheric pressure passage 16 and the vacuum Pav in the vacuum chamber 12a gradually approaches to the atmospheric pressure value because the orifice 19 is provided in the atmospheric pressure passage 16. Therefore the the sectional area of the secondary air passage 11 is gradually reduced and which, in turn, reduces the amount of the secondary air. On the other hand, the vacuum Pe is supplied to the vacuum chamber 47a and the vacuum $P_{EGR}$ is gradually increased, by means of the orifices 40, to increase the opening degree of the EGR flow control valve 47, which in turn, increases the amount of EGR.

Therefore, the magnitude of the vacuum Pav increases when the rich signal is generated and decreases when the the lean signal is generated, as shown in FIG. 3C. The magnitude of the vacuum $P_{EGR}$, on the other hand, decreases when the rich signal is generated and increases when the lean signal is generated, as shown in FIG. 3D. Therefore, during the period in which the air/fuel ratio is detected to be rich, the amount of the air intake side secondary air increases to make the air/fuel ratio leaner and the amount of EGR decreases. Similarly, during the period in which the air/fuel ratio is detected to be lean, the amount of the air intake side secondary air decreases and the amount of EGR increases.

Further, parameters such as the magnitude of the vacuum Pe and the sectional area of the orifice 17 are determined, when the the rich signal.

It will be appreciated from the foregoing, that according to the present invention, a single source is used for supplying a control pressure to the air control valve and the EGR flow control valve for controlling the opening degree of each valve, and further, such a control mode is enabled that the amount of EGR decreases during the period in which the air/fuel ratio is shiftted to the lean side by the application of the secondary air and the amount of EGR increases during the period in which the air/fuel ratio is enriched by reducing the supply amount of the secondary air. Thus, the occurence of the leaning of the air/fuel ratio and the increase of the EGR at the same time, is prevented. Therfore, the temperature of the combustion in the cylinders is maintained in a desirable level, and a good driveablity is assured.

It will be understood that the foregoing description is for illustrative purpose only, and is not intended to limit the scope of the invention. Rather, there are numerous equivalents to the preferred embodiments, and such are intended to be covered by the appended claims.

What is claimed is:

1. An air intake side secondary air supply system for an internal combustion engine equipped with an exhaust gas recirculation system including an EGR passage connecting an exhaust gas passage and an intake air passage of the engine and a EGR flow control valve disposed in the EGR passage for varying sectional area of the EGR passage in accordance with a pressure level in a pressure chamber there of, comprising:

an air intake side secondary air supply passage leading to the intake air passage, downstream of a throttle valve;

an air control valve disposed in said secondary air supply passage for varying sectional area of the secondary air supply passage in accordance with a pressure level in a pressure chamber thererof;

an air/fuel ratio determination means for determinating air/fuel ratio from composition of an exhaust gas flowing in the exhaust gas passage and producing an air/fuel ratio signal;

a source of a first control pressure for supplying a first control pressure capable of opening the EGR flow control valve into said pressure chamber of the EGR flow control valve via a first pressure supply passage; and a pressure supply means for making communication between said first pressure passage and the pressure chamber of the air control valve in accordance with said air/fuel ratio signal and gradually varying pressure level in the pressure chamber of the air control valve.

2. An air intake side secondary air supply system as set forth in claim 1, wherein said pressure supply means further includes a source of second control pressure for supplying a second control pressure capable of closing the air control valve into a second control pressure supply passage, and a communicating means for making communication between the pressure chamber of the air control valve and one of the first pressure supply passage and the second pressure supply passage in accordance with the air/fuel ratio signal, and an orifice provided in the first pressure supply passage.

3. An air intake side secondary air supply system as set forth in claim 1, wherein said source of first control pressure produces a vacuum pressure whose magnitude is proportional to the amount of an intake air of the engine.

4. An air intake side secondary air supply system as set forth in claim 3, wherein said source of first control pressure consists of:

a first vacuum passage extending from said intake air passage, downstream or in the proximity of the throttle valve;

a second vacuum passage extending from inside of a venturi formed in said intake air passage, upstream from said throttle valve;

a control intake air passage leading from an air inlet port to a portion of the intake air passage downstream of said throttle valve;

a vacuum responsive regulation valve having a first vacuum chamber disposed in the middle of said control intake air passage, a first valve chamber communicated with said second vacuum passage, for making the communication between the first vacuum passage and the second vacuum passage through said first valve chamber, in accordance with a pressure difference of the first valve chamber and the first vacuum chamber;

a vacuum responsive air valve having a second vacuum chamber communicated with said first vacuum passage, a second valve chamber disposed in said control intake air passage, downstream from said first vacuum chamber, for providing a communication through said control intake air passage, at an opening degree corresponding to a pressure difference between said second vacuum chamber and said second valve chamber, whereby providing a vacuum in the second vacuum chamber as said first control pressure.

* * * * *